(12) United States Patent
Roberts

(10) Patent No.: US 6,999,227 B2
(45) Date of Patent: Feb. 14, 2006

(54) PROJECTION SYSTEM

(75) Inventor: Ben D. Roberts, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/699,061

(22) Filed: Oct. 31, 2003

(65) Prior Publication Data
US 2005/0094246 A1   May 5, 2005

(51) Int. Cl.
  *G02B 26/00*   (2006.01)
(52) U.S. Cl. .................................. 359/292
(58) Field of Classification Search ......... 359/290, 359/291, 292, 293, 295, 298; 353/100, 102

See application file for complete search history.

(56) References Cited

U.S. PATENT DOCUMENTS

| | | | |
|---|---|---|---|
| 5,280,277 A | | 1/1994 | Hornbeck |
| 5,461,411 A | | 10/1995 | Florence et al. |
| 5,510,824 A | * | 4/1996 | Nelson ..................... 347/239 |
| 5,815,303 A | * | 9/1998 | Berlin ..................... 359/214 |
| 5,844,588 A | | 12/1998 | Anderson |
| 5,903,323 A | * | 5/1999 | Ernstoff et al. ............. 348/771 |
| 6,231,193 B1 | * | 5/2001 | Sugawara ................... 353/102 |
| 6,605,796 B1 | * | 8/2003 | Brandinger et al. ... 219/121.67 |
| 6,788,282 B1 | * | 9/2004 | Ito ............................. 345/103 |

* cited by examiner

Primary Examiner—Scott J. Sugarman
Assistant Examiner—Tuyen Tra
(74) Attorney, Agent, or Firm—Trop, Pruner & Hu, P.C.

(57) ABSTRACT

An apparatus includes a mirror array to form a projected image that includes pixels. The apparatus also includes a circuit to, for each pixel, control the mirror array to selectively combine reflected light from at least two mirrors of the array to regulate an intensity of the pixel.

30 Claims, 6 Drawing Sheets

PROJECTION SYSTEM

BACKGROUND

The invention generally relates to a projection system.

Referring to FIG. 1, a typical mirror-based projection system 20 may include at least one mirror array 10 (a mirror array of a digital micromirror device (DMD), for example) that reflects light in a manner that produces an image on a projection screen 19. The mirror array 10 includes mirrors that are selectively tilted to spatially control the reflection of light (from a light source (not shown)) to and away from the screen 19 to form the image. More specifically, in the projection system 20, each mirror of the array may be uniquely associated with one pixel of the image so that the mirror controls the intensity of the associated pixel. The projection system 20 controls the tilt angle of each mirror to control when the mirror reflects light into a projection cone 18 of light that projection optics 16 (of the system 20) casts onto the projection screen 19. Depending on the desired pixel intensity, the projection system 20 may tilt a particular mirror at a first angle to reflect light into the cone 18 of light to illuminate the associated pixel, or the projection system 20 may tilt the mirror at another angle to reflect light away from the cone 18 of light and darken the associated pixel.

As a more specific example, an exemplary state of the mirror array 10 is depicted in FIG. 2. Assuming a two tone black and white projected image for this example, some mirrors (such as the mirrors 12) of the array 10 are associated with black pixels of the image, and other mirrors (such as mirrors 13) of the array 10 are associated with white pixels of the image. The mirrors that are associated with the black pixels are tilted at angles to reflect incident light away from the cone 18 (FIG. 1) of light; and the mirrors that are associated with white pixels are tilted at angles to reflect the incident light into the cone 18 of light. The reflection of light into or away from the cone 18 of light is depicted in FIG. 1 for an exemplary mirror 14 of the array 10. The mirror 14 controls the intensity of an associated pixel 11 of an image that is formed on the projection screen 19. To produce a white pixel, the projection system 20 tilts the mirror 14 at an angle to reflect light along a path 17 that intersects the pixel 11 and is within the cone 18. To produce a black pixel, the projection system 20 tilts the mirror 14 at an angle to reflect light along a path 15 that falls outside of the cone 18.

To create intermediate pixel intensities (called gray scale intensities) other than the two tone intensities described above, the projection system may use pulse width modulation (PWM). With PWM, the projection system controls the tilt angle of each mirror pursuant to a PWM cycle to establish a particular intensity value for a given pixel. More specifically, pursuant to a PWM cycle, a gray scale intensity for a particular pixel is created by moving the associated mirror rapidly between a position in which the mirror reflects light into the cone 18 (during an "on time" of the PWM cycle) and a position in which the mirror directs the incident light along a path outside of the cone 18 (during an "off time" of the PWM cycle). The fraction of time in which light is directed toward the pixel as compared to the duration of the PWM cycle determines the average brightness, or gray scale intensity, of the pixel. The viewer's eyes integrate these rapid flashes into a perception of a gray scale intensity for the pixel. The gray scale in this sense also applies to color images that result from a projection system that combines red, green and blue images (created by directing red, green and blue light beams toward the mirror array 10) to form a color image.

The conventional projection system updates the projected image pursuant to a frame rate (a 60 Hz rate, for example). This frame rate places a limit on the duration of the PWM cycle, as the PWM period (the inverse of the frame rate) cannot extend beyond the frame period. Other factors may compress the time that is allocated for each PWM cycle. For example, less time is allocated to each PWM cycle if the number of rows in the projected image exceeds the number of rows of mirrors in the mirror array. For this arrangement, the projection system may generate a perceived projected image by scanning the perceived image (once every frame period) with the images that are created by the mirror array. This means multiple updates must be made to the mirror array during each frame period, thereby decreasing the time allocated for each PWM cycle by the corresponding multiple. Furthermore, the mirror array may be used to sequentially form three primary color (red, green and blue, for example) images to produce a perceived color composite image, thereby further compressing the time allocated to each PWM cycle. Additionally, the time allocated to each PWM cycle may be further reduced by multiple refresh operations that redraw the image that the user sees on the projection screen 19 several times during each frame period. Thus, a significantly small time may be allocated for the PWM cycle so that a potential challenge associated with the above-described approach is that the mirror array may not be capable of moving its mirrors rapidly enough to accommodate the allocated PWM cycle time.

Thus, there is a continuing need for an arrangement and/or technique that addresses one or more of the problems stated above as well as an arrangement and/or technique that addresses one or more problems that may not be set forth above.

DETAILED DESCRIPTION

Figure 3:
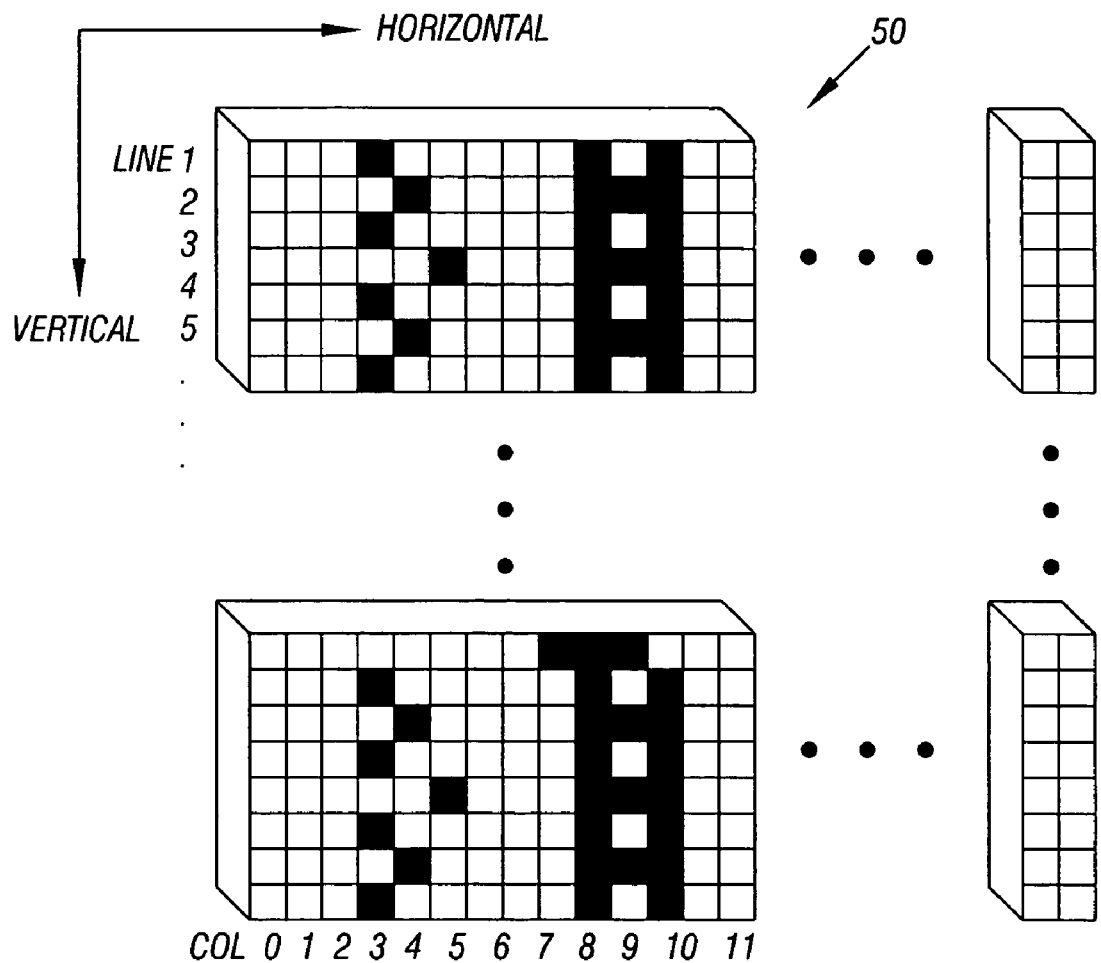
FIG. 3 is a schematic diagram of a mirror array according to an embodiment of the invention.

Referring to FIG. 3, in accordance with an embodiment of the invention, a mirror array 50 may be used to form projected images in a projection system. This projection system may be used for purposes of displaying electronically generated or transmitted data on a reflective screen. As examples, the projection system may be used in forming images on computer screens and television screens in response to signals received from a television tuner, DVD player, etc.

The mirror array 50 may be used to form gray scale intensities in a projected image without modulating (using pulse width modulation (PWM), for example) the tilt angles of the mirrors of the array 50. To create a particular projected image having gray scale intensities, each mirror of the array 50 either reflects light toward the image or away from the image without being modulated between two different tilt angles. Thus, the light is modulated by controlling the tilt angles of mirrors of the array 50 to digitally steer light either into the cone of light to be projected or elsewhere (to a non-reflective light "dump," for example). Conventional PWM projection systems achieve gray scale intensity variations by varying the percentage of time that the mirrors reflect light towards the screen. In contrast, in accordance with embodiments of the invention, the percentage of mirrors that point toward the projection screen are varied for a given column in the array 50.

More specifically, in some embodiments of the invention, the mirrors of the array 50 are organized into groups of multiple mirrors. Each group of mirrors is associated with and controls the intensity of a different pixel of the projected image. More particularly, to form a particular gray scale intensity for a particular pixel, each mirror of the associated group either reflects light in a path that is directed toward the pixel or in a path that is directed away from the pixel. The light reflections toward the pixel are combined (as described below) to form the gray scale intensity for the pixel.

The mirror array 50 is therefore used in a manner different from a conventional mirror array, an array in which each mirror is associated with a different pixel of the projected image so that each mirror, and only that mirror, establishes the intensity of the associated pixel. Thus, in accordance with some embodiments of the invention, the mirror array 50 includes a gray scale extension, in that multiple mirrors are used to form the gray scale intensity for each pixel, as described below.

In the context of this application, the phrase "projected image" means the multiple pixel image that is produced by a particular state of the mirror array when used in a projection system (described below). During a particular frame period, the mirror array 50 may have several different states and thus, may produce several different projected images. For example, to produce what appears to be a color image (to a viewer), the mirror array 50 may assume a first state to reflect red light to produce a red projected image, another state to reflect green light to subsequently produce a green projected image and a third state to reflect blue light subsequently produce a blue projected image. The successive appearance of the red, green and blue projected images are perceived by a viewer of the projection system to form a multi-color composite image. Furthermore, the mirror array 50 may produce additional projected images during a particular frame period for purposes of refreshing the images seen by the viewer.

Thus, the mirror array 50 reflects light to produce projected images that are perceived by the human eye to form other composite images. As noted above, the color composite image is a perceived image, as the color composite image may be formed from red, green and blue images. Furthermore, each red, green or blue image may also not be formed at one time on the projection screen. Rather, in some embodiments of the invention, the mirror array 50 forms a single row of pixels. Thus, to create each red, green or blue image, in accordance with some embodiments of the invention, the mirror array 50 is used to form successive single row projected images so that the red, green or blue image is effectively scanned onto the projection screen one pixel row at a time.

Figure 4:
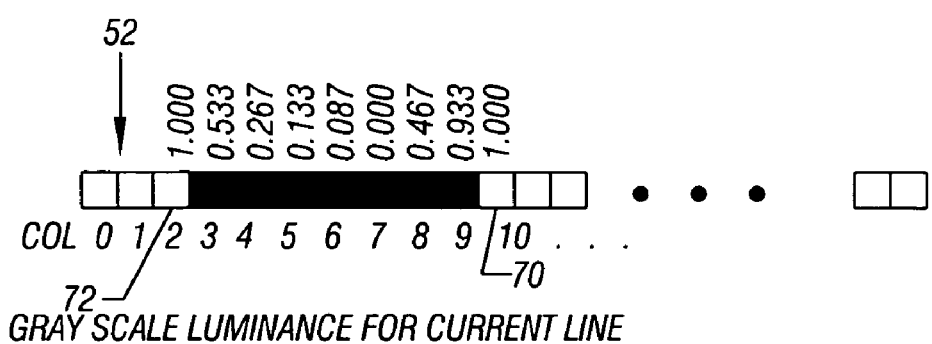
FIG. 4 is an illustration of an image line formed from the mirror array of FIG. 3 according to an embodiment of the invention.

FIG. 4 depicts an exemplary projected pixel row 52 for the exemplary state of the mirror array 50 that is depicted in FIG. 3. In FIG. 3, the white boxes depict mirrors (called "on mirrors" herein) that reflect light toward a projection cone of light (and thus, toward the projected image) of the projection system, and the black boxes depict mirrors (called "off mirrors herein) that reflect light away from the projection cone of light (and thus, away from the projected image).

The horizontal dimension of the mirror array 50, in some embodiments of the invention, is associated with the pixel positions of the pixel row, and the vertical dimension of the mirror array 50 is associated with the intensity values for each of the pixels of the projected pixel row. Thus, each column of mirrors in the array 50 is associated with one of the pixels of the projected pixel row image so that the gray scale intensity of the associated pixel is formed from the total light that is reflected by the on mirrors of the associated column. In general, a greater number of on mirrors for a particular column means a lighter gray scale intensity, and a lower number of off mirrors for the column means a darker gray scale intensity.

Figure 5:
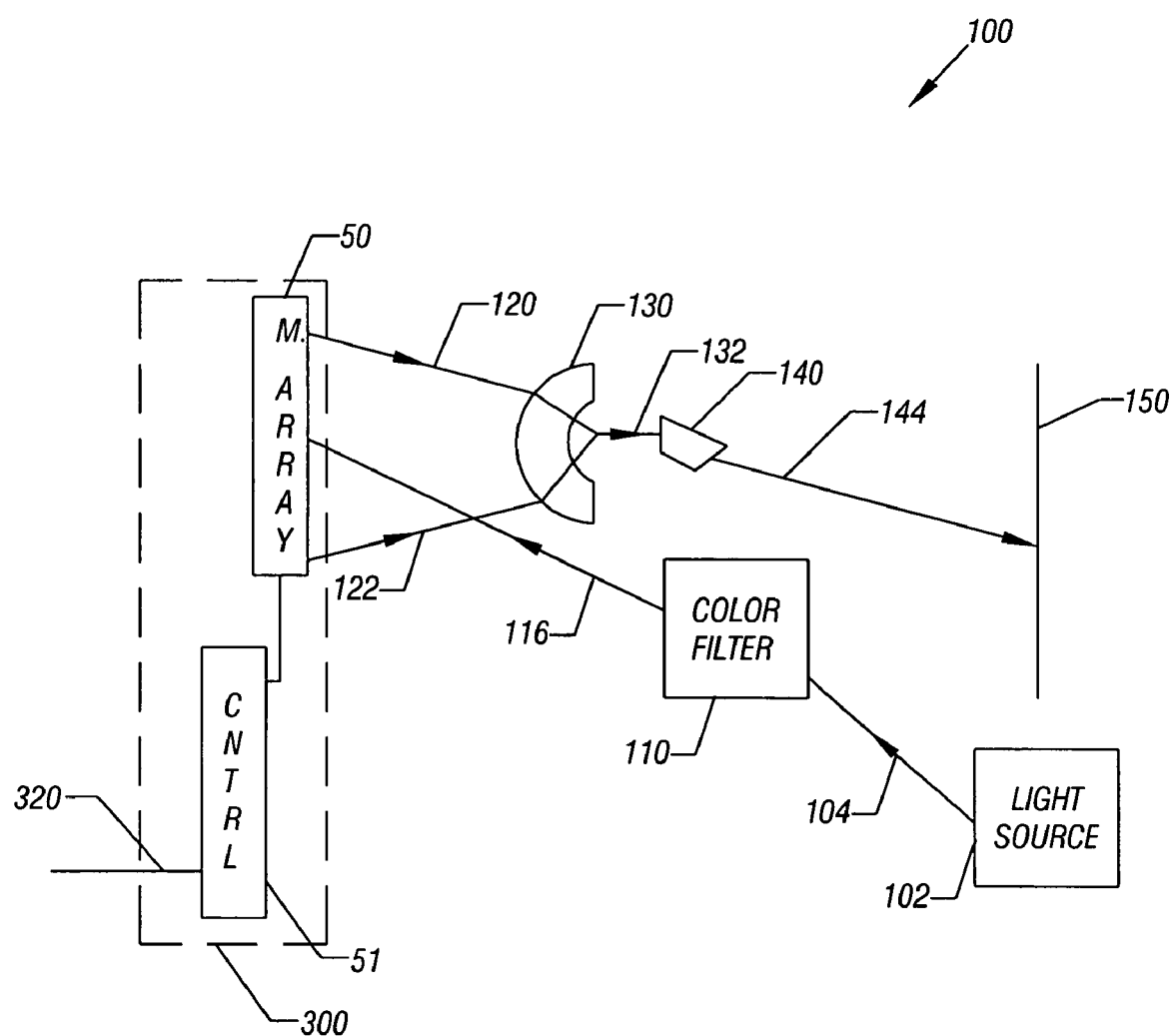
FIG. 5 is a projection system according to an embodiment of the invention.

In some embodiments of the invention, the mirror array 50 may be used in a projection system 100 that is depicted in FIG. 5. In addition to the mirror array 50, the projection system 100 includes a light source 102 that produces a generally white light beam (i.e., a beam that contains all primary color components) that generally follows an optical path 104 to a color filter 110 (a color filter wheel, for example). In some embodiments of the invention, at any particular time, the color filter 110 filters two primary color components from the incident light beam to produce a primary color light beam that is directed along an optical path 116 that is directed toward the mirror array 50. As a more specific example, in some embodiments of the invention, the color filter 110 may produce three primary color beams (extending along the optical path 116) in succession.

For example, in some embodiments of the invention, the color filter 110 may produce a red color beam, then a green beam that is followed by a blue color beam. Continuing this example, these beams are incident upon the mirror array 50 for purposes of forming red, green and blue images on a projection screen 150 of the system 100. These red, green and blue images appear to a viewer of the projection screen 150 to form a composite color image on the screen 150.

The projection system 100 may include additional optics that are not depicted in FIG. 5. For example, in some embodiments of the invention, the light beam that is produced by the color filter 110 may pass through optics that are not depicted in FIG. 5 before the beam reaches the mirror array 50. However, regardless of the specific optics, the beam that leaves the color filter 110 is eventually incident upon the mirrors of the array 50. As another example, in some embodiments of the invention, the projection system 100 may include optics between the light source 102 and the color filter 110. The optics before the mirror array 50 direct the light from the light source 102 to efficiently and evenly illuminate the mirror array 50. The angle of incidence upon the mirror array 50 is selected so that the mirrors of the array 50 switch the light completely to provide high contrast in the projected image.

The mirrors of the array 50 reflect the beam from the color filter 110 to form the projected image. More specifically, for a particular image, some of the mirrors are "on mirrors," and thus, these mirrors are tilted to direct light into the projection cone of light (i.e., these mirrors reflect light into optical paths that eventually intersect the projected image.) Other mirrors for this image are off mirrors, and thus, these mirrors are tilted to direct light away from the projection cone of light (i.e., these mirrors reflect light away from the optical path that intersects the projected image).

Figure 8:
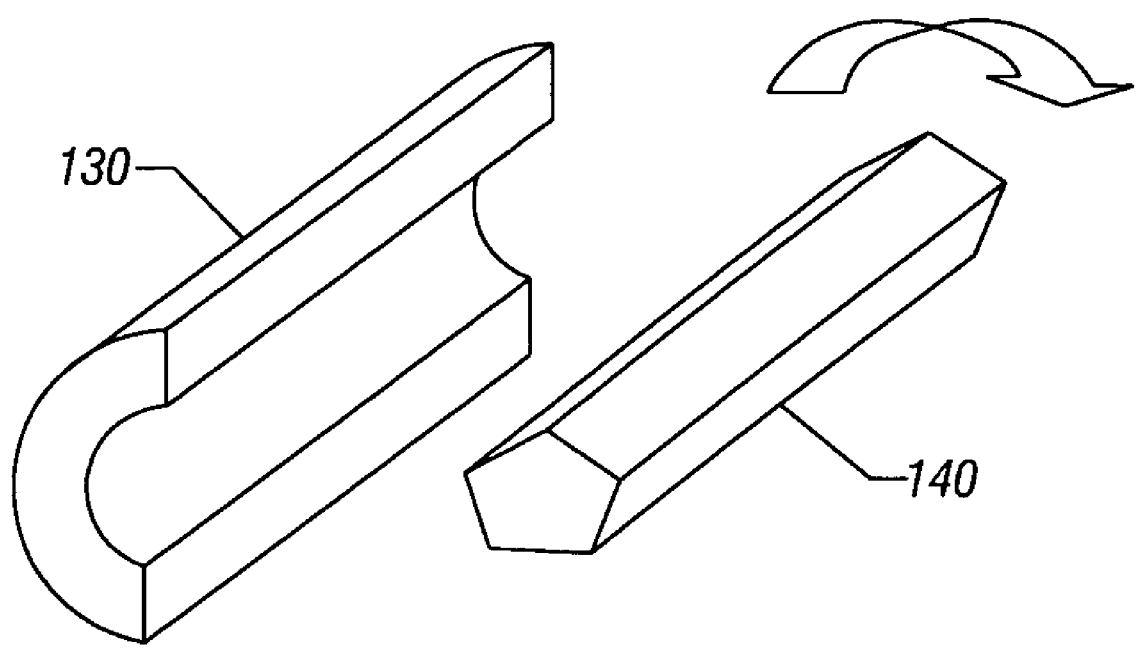
FIG. 8 is a perspective view of a condensing lens and scanning lens of the projection system of FIG. 5 according to an embodiment of the invention.

The projection system 100, in some embodiments of the invention, includes a condensing lens 130. A perspective view of the condensing lens 130 and a scanning lens 140 (described below) is depicted in FIG. 8. As can been seen from this figure, in some embodiments of the invention, the condensing lens 130 may be generally cylindrical. Referring both to FIGS. 5 and 8, the condensing lens 130 receives light (as indicated by the light rays 120 and 122) that is directed toward the lens 130 by the on mirrors of the array 50. Thus, each on mirror produces an associated beam of light that is directed toward the condensing lens 130. In some embodiments of the invention, the condensing lens 130 vertically compresses these light beams together to form a beam (directed along a path 132) that indicates a particular pixel row of the projected image. Stated differently, for each column of mirrors in the array 50, the condensing lens 130 directs the reflected light from the on mirrors of that column into a single optical path that intersects a particular pixel of the projected image. Thus, in some embodiments of the invention, the condensing lens 130 maps each column of mirrors of the array 50 to a unique pixel of the projected single pixel row image. As a more specific example, the condensing lens 130 maps the mirrors of column 9 of the array 50 (see FIG. 3) into a pixel 70 (see FIG. 4) of the projected pixel row, maps the mirrors of column 2 of the mirror array 50 into a pixel 72 of the projected pixel row, etc.

For purposes of scanning the projected image with the single projected pixel row, the projection system 100 may include a scanning lens 140 that directs the beam from the condensing lens 130 along an optical path 144 to a particular vertical position on the projection screen 150. Thus, the scanning lens 140 varies the vertical position of the optical path 144 to establish each row of the projected image. Therefore, during each frame period, the scanning lens 140, in accordance with some embodiments of the invention, draws a particular image one pixel row image in a top-to-bottom or bottom-to-top fashion.

In other embodiments of the invention, the scanning lens 140 may be replaced by a mirror or another optical device. Regardless of the form of this optical device, the optical device sweeps a concentrated extended vertical array into a line at the screen. The optical device may be a mechanically moved element that may be driven, for example, from the same motor as a color wheel.

In some embodiments of the invention, for purposes of reducing artifacts and flickering in the projected image, the projection system 100 may perform several refresh operations during each frame period. For example, in some embodiments of the invention, the projection system 100 may refresh the image that is seen by the viewer four times (as an example) during each frame period. In some embodiments of the invention, the projected image is a color composite image formed from a red image, a green image and a blue image that are formed in succession. For four refreshes of the color composite image during each frame period, the projection system 100 generally forms twelve images of the projection screen during each frame period: four red images, four green images and four blue images. The human eye perceives a composite color image from the successively displayed and overlayed images. For embodiments of the invention in which mirror array 50 forms the lines of the projected image one row at a time, the projection system 100 actually forms 12*V (where "V" represents the number of rows of the perceived image) projected single row images on the projection screen 150. Thus, the projection system 100 updates the mirror array 50 12*V times during each frame.

In some embodiments of the invention, the mirror array 50 may be part of a projection assembly 300 (an assembly mounted on a printed circuit board (PCB), for example) that also includes a controller 51. As an example, the controller 51 may receive video data via one or more input lines 320 and controls the tilt angles of the mirrors of the array 50 accordingly, consistent with the operation of the mirror array 50 described herein.

Other variations are possible. For example, in other embodiments of the invention, for a given state, the mirror array 50 may project a multiple row pixel image. As an example, in these embodiments of the invention, a first contiguous group of mirror rows may form the gray scale intensities for a particular projected pixel row, a second contiguous group of mirrors adjacent to the first group of mirrors may form the gray scale intensities for the adjacent projected pixel row, etc. Continuing the example, the projection system may include a condensing lens for each group. Many other variations are possible and are within the scope of the appended claims.

In some embodiments of the invention, the mirror array 50 has as many mirrors in the horizontal direction as there are pixels of horizontal resolution; and the mirror array 50 has as many mirrors in the vertical direction as there are shades of gray to display. The number of shades (i.e., the number of gray scale intensity values) may be expressed as bits of gray resolution, as described by the following equation:

$$\text{Shades}=2^G, \qquad \text{Eq. 1}$$

where "G" represents the number of bits used to indicate the gray value. For example, for eight bits of resolution, the number of shades is $2^8=256$. Thus, in some embodiments of the invention, to create these 256 shades, each column of mirrors in the array 50 includes 256−1 (i.e., no mirrors for the darkest (black) level)=255 mirrors, plus any mirrors added for redundancy. The number of mirrors for each shade (for the example of 256 shades) is described in the table below:

TABLE 1

| Gray Level | Binary MSB . . . LSB | Mirrors Toward Condensing Lens |
|---|---|---|
| Black | 00000000 | 0 |
| 1 | 00000001 | 1 |
| 2 | 00000010 | 2 |
| 3 | 00000011 | 3 |
| 4 | 00000199 | 4 |
| . | | |
| . | | |
| 253 | 11111101 | 253 |
| 254 | 11111110 | 254 |
| White | 11111111 | 255 |

In some embodiments of the invention, each bit of the digital value (a byte, for example) that indicates the gray scale intensity value for a particular pixel controls the number of mirrors (in the associated column) that reflect light into the condensing lens 130. For the 8 bit example described above, if the most significant bit (MSB) is a "1," then, in some embodiments of the invention, the projection system 100 assigns 128 mirrors to reflect light into the condensing lens 130 (i.e., 128 "on mirrors") in response to this bit. If the next most significant bit (MSB) is a "1," then, in some embodiments of the invention, the projection system assigns 64 bits to reflect light into the condensing lens 130 in response to this bit, etc. If the bit in a particular bit position is a "0," then no mirrors are assigned to reflect light into the cone of projection due to this bit. The mirror assignments for different bit positions are illustrated in the table below:

TABLE 2

| Bit | Code | Mirrors Assigned |
|---|---|---|
| 7 (MSB) | 10000000 | 128 |
| 6 | 01000000 | 64 |
| 5 | 00100000 | 32 |
| 4 | 00010000 | 16 |
| 3 | 00001000 | 8 |
| 2 | 00000100 | 4 |
| 1 | 00000010 | 2 |
| 0 (LSB) | 00000001 | 1 |

Thus, as a more specific example, for an eight bit gray scale value of "10010111b" (wherein the "b" suffix denotes a binary representation) for a particular pixel, 151 mirrors of the associated column are assigned to reflect light into the cone of projection: 128 (bit position 7)+0 (bit position 6)+0 (bit position 5)+16 (bit position 4)+0 (bit position 3)+4 (bit position 2)+2 (bit position 1)+1 (bit position 0).

In some embodiments of the invention, the mirrors that are associated with a particular bit position of the gray scale intensity value are evenly spatially distributed along the column. For example, the 128 mirrors that are associated with the most significant bit may occupy about every second vertical position (i.e., about every second row of the column), the 64 mirrors that are associated with the next most significant bit may occupy every second vertical position, etc.

Figure 6:
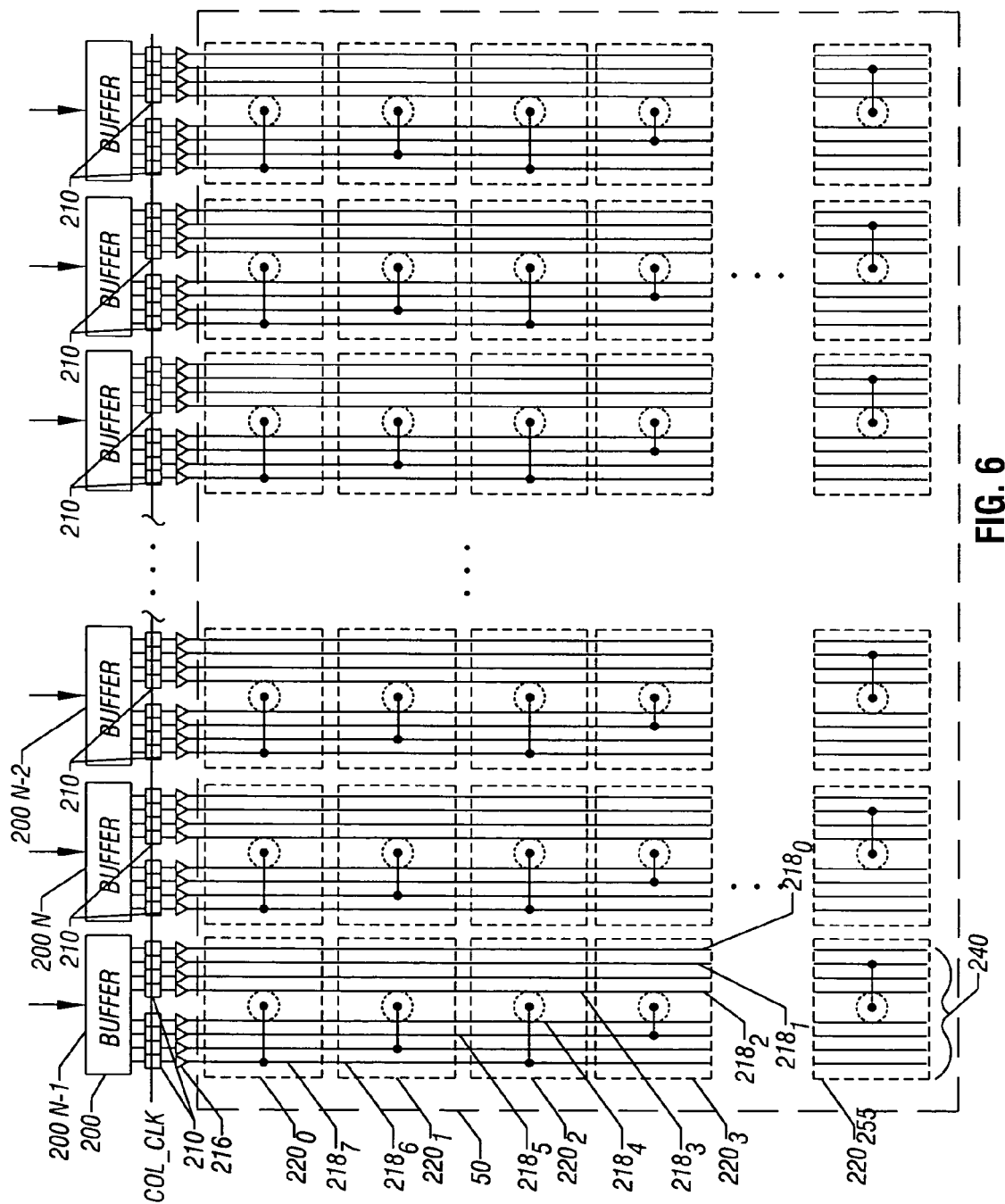
FIG. 6 is a schematic diagram of the mirror array of FIG. 5 according to an embodiment of the invention.

FIG. 6 depicts a more detailed diagram of the mirror array 50 in accordance with some embodiments of the invention. The mirror array 50 may be part of a semiconductor package 199 that includes N buffers 200 (buffers $200_1$, $200_2$, $200_{N-2}$, $200_{N-1}$ and $200_N$, depicted as examples), each of which is associated with a particular column of mirrors of the array 50 and furnishes data to control the mirrors of the column. More specifically, in some embodiments of the invention, each buffer 200 may be synchronized to a clock signal (called COL_CLK) for purposes of updating the mirrors of the associated column. In this regard, the buffer 200, when triggered by the COL_CLK signal, furnishes a new set of data to drivers 216 that, in turn, produce corresponding signals on control lines 218 of the mirror array 50. Each control line 218 is associated with one of the mirrors of the array 50 and communicates a signal that is indicative of a particular bit of data. If the bit is a logic one, then, in some embodiments of the invention, the corresponding control line 218 communicates a signal to cause the associated mirrors to tilt at the appropriate angle to reflect light into the condensing lens 130. If the bit is a logic zero, then, in some embodiments of the invention, the corresponding control line 218 communicates a signal to cause the associated mirrors to tilt at the appropriate angle to reflect light away from the condensing lens 130. The data is stored in the buffers 200 in a manner to form the appropriate images on the projection screen. As a more specific example, the data that the buffers 200 provide to the drivers 216 may be ordered to implement the appropriate color sequence and refresh sequences described above.

In some embodiments of the invention, each buffer 200 furnishes a new set of data to the drivers 216 in response to each positive going edge of the COL_CLK signal. Thus, the frequency of the COL_CLK signal determines the rate at which the mirror array 50 is updated. Other variations are possible. For example, in some embodiments of the invention, the buffers 200 may respond to both positive and negative going edges of the COL_CLK signal to furnish data to the mirror array 50. For these embodiments of the invention, the update frequency is twice that of the frequency of the COL_CLK signal.

As a more specific example, an exemplary column 240 of the mirror array 50 is depicted in FIG. 6, in accordance with some embodiments of the invention. The column 240 includes eight control lines 218 (control lines $218_7$, $218_6$, $218_5$, . . . $218_0$) that control the tilt angles of two hundred fifty-six mirrors (mirrors $220_{255}$, $220_{254}$, $220_{253}$, . . . $220_0$) of the column 240. These eight control lines 218 receive signals that are furnished at the output terminals of eight of the drivers 216. These eight drivers 216 furnish these signals in response to eight bit signals that are furnished by the buffer $200_N$. Each control line 218 is associated with a different bit position of the digital value that indicates the gray level. For the exemplary column 240, the control lines $218_7$, $218_6$, $218_5$, . . . $218_0$ are associated with the bit positions 7–0, respectively. Thus, the control line $218_7$ communicates a signal indicative of the most significant bit (i.e., bit 7) of the digital gray scale intensity value, the control line $218_6$ communicates a signal indicative of bit 6 of the digital gray scale intensity value, the control line $218_5$ communicates a signal indicative of bit 5 of the digital gray scale intensity value, etc.

More mirrors are connected to a control line 218 that is associated with a higher bit order than a control that is associated with a lower bit order. Thus, continuing the discussion of the exemplary column 240, one hundred twenty-eight mirrors 220 (such as the mirrors $220_0$ and $220_2$, for example) are connected to the control line $218_7$, sixty-four mirrors 220 (such as the mirror $220_1$, for example) are connected to the control line $218_6$, thirty-two mirrors 220 are connected to the control line $218_5$ (such as the mirror $220_3$), etc. The mirrors 220 are generally evenly, spatially distributed along the column 240. For example, the one hundred twenty-eight mirrors (such as mirrors $220_0$ and $220_2$, for example) that are associated with the most significant bit occupy about every other mirror position. As another example, the two mirrors (such as the mirror $220_{255}$, for example) that are associated with the second least significant bit (i.e., bit position number 1) occupy about every one hundred twenty-eighth mirror position.

The aspect ratio of each mirror is not critical, in some embodiments of the invention. In this manner, the mirrors of the array 50 may be longer in the vertical direction, in some embodiments of the invention, for purposes of providing more even illumination. The drivers for the mirrors may or may not be fabricated on the same substrate as the mirrors, depending on the particular embodiment of the invention.

Figure 1:
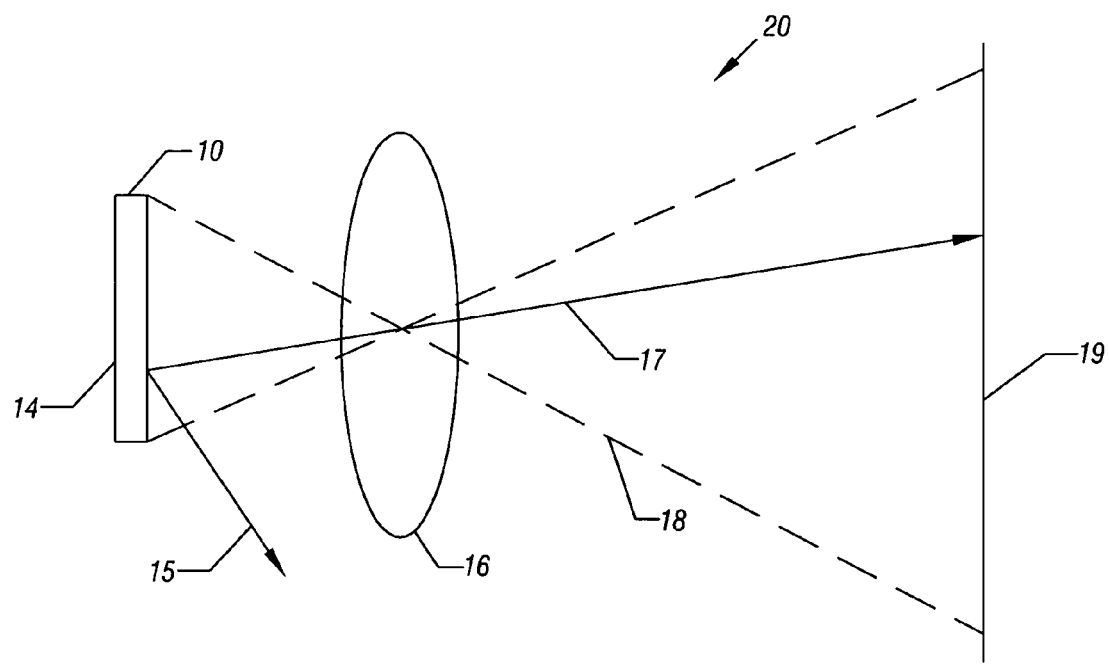
FIG. 1 is a schematic diagram of a projection system of the prior art.
Figure 2:
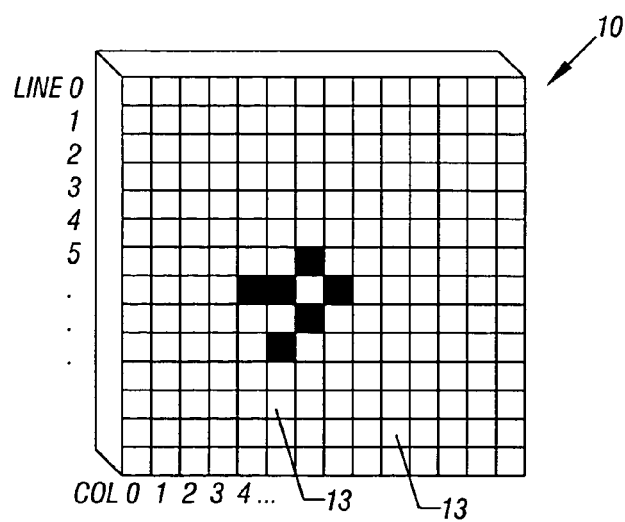
FIG. 2 is a schematic diagram of a mirror array of the prior art.
Figure 7:
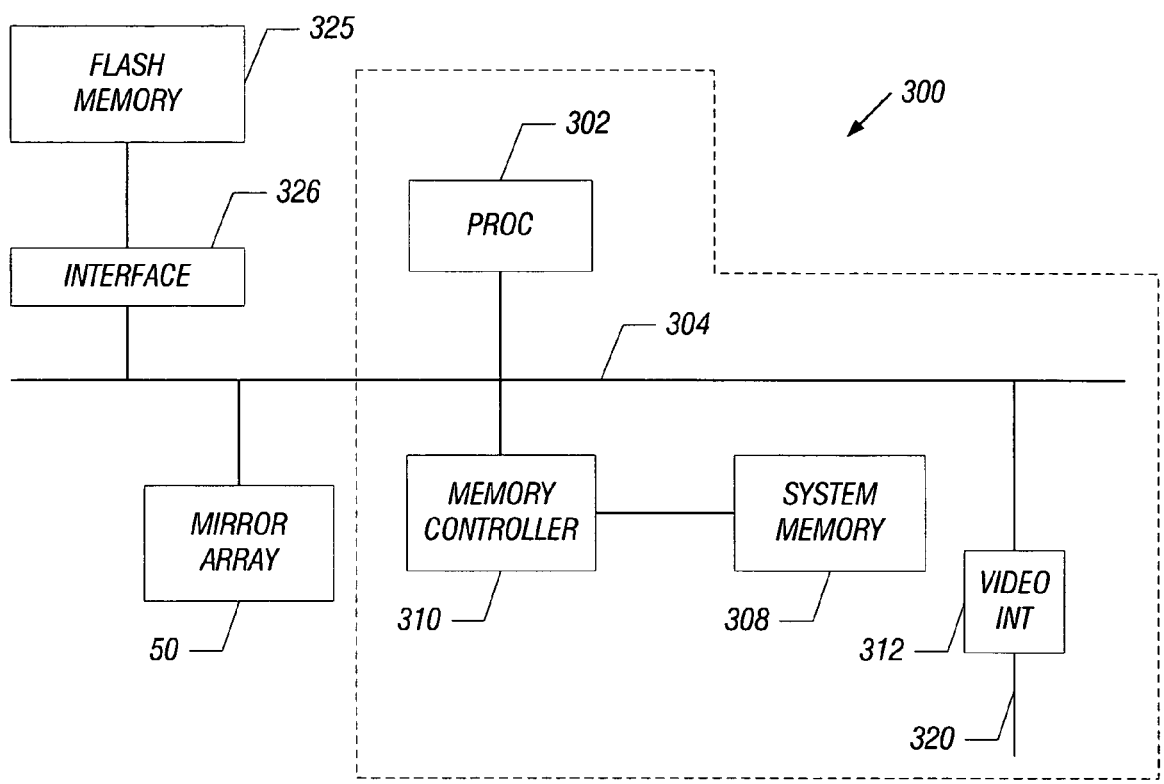
FIG. 7 is a schematic diagram of mirror array control circuitry according to an embodiment of the invention.

Referring to FIG. 7, in some embodiments of the invention, the controller 51 of the projection assembly 300 (see also FIG. 1) may include a processor 302 (a microprocessor, for example) that is coupled to a system bus 304. A memory controller 310 may also be coupled to the system bus 304 and control the storage and retrieval of data with a system memory 308. The controller 51 may include a video interface 312 that includes one or more input lines 320 for receiving a video signal. The video signal indicates a video to be displayed on the projection screen 150. The processor 302 may store data indicative of this video signal in the system memory 308 and perform video processing techniques on the data. The processor 302 may also retrieve data from the system memory 308 and store the data in the memory buffers 200 (FIG. 6) of the mirror array 50 for purposes of controlling the images that are formed by the mirror array 50. In some embodiments of the invention, the controller 51 includes a flash memory 325 (coupled to the system bus 304 via an interface 326) for purposes of storing program instructions to cause the processor 302 to control the mirror array 50 as described herein. Thus, in some embodiments of the invention, the instructions that are stored in the memory 325 cause the processor 302 to, for each pixel, control the mirror array to selectively direct reflected light from the mirror array into condensing optics from at least two mirrors of the array to regulate an intensity of the pixel. Furthermore, in accordance with some embodiments of the invention, instructions that are stored in the memory 325 cause the processor 302 to group mirrors of the mirror array into groups of multiple mirrors with each group being associated with a different pixel of the projected image, and the mirrors of each group collectively form a gray scale intensity for the associated pixel.

FIG. 7 depicts one out of many possible embodiments of the projection assembly. For example, in some embodiments of the invention, a frame buffer may be located between the processor 302 and the system bus 304. With this arrangement, the data from the processor need not be synchronous with the data on the system bus 304. As another example, in some embodiments of the invention, the mirror array 50 may be biased and signals provided to the mirror array 50 may be conditioned by circuitry not depicted in FIG. 7.

The projection system 100 may provide one or more of the following advantages. The light that is incident upon the mirror array is spread across the entire array and is not concentrated into a narrow line, as it would have to be in a conventional scanning approach. The condensing lens concentrates the vertical extent of the array into a line by optical means so that the power density of light on the mirror array is less than if concentrated into a line on the mirror array, thereby causing less heating of the mirror array. The projection system may be significantly less sensitive to pixel failures than a conventional mirror array-based projection system. In this manner, in such a conventional system, a failing mirror (since it maps to a single pixel) appears in the projected image as a permanent light or dark spot, which will be quite noticeable to a viewer. In contrast, in the projection systems described herein, a failing mirror affects a small portion of the total pixel light and will be much less noticeable. For example, for a mirror array in accordance with some embodiments, each pixel of the projected image is formed using up to fifteen mirrors (depending on the intensity of the pixel). Therefore, a failing mirror may affect only 1/15th (as an example) of the total brightness of the pixel in the column where the failure occurs.

Continuing with the possible advantages of the projection system 100 that is described herein, unlike conventional mirror-based projection systems, the projection system easily permits the incorporation of redundant mirrors. For example, in some embodiments of the invention, the mirror array may include an additional row of mirrors for redundancy. Each mirror in this row may be connected via a silicon fuse to the control line of the failing mirror. If the bad mirror is detected in testing to be permanently dark, the redundant mirror may be connected via the fuse to the appropriate control line to replace the bad mirror. The result of this technique is a higher yield for the array, since a small defect may be repaired.

Another potential advantage of the projection system 100 described herein is that pulse width modulation (PWM) is not used for gray scale intensity control. This reduces the required response time of the mirrors by the factor of the number of possible values of gray in the scale, relative to a single line scanning approach. Yet another advantage of the projection system described herein is that the mirrors of the mirror array do not need to be square. In this manner, the optical scanning and condensing system may adjust for any non-square mirror aspect ratio. Conversely, in some embodiments of the invention, the mirror aspect ratio may be designed for the optical properties of the system.

The following table depicts different performance parameters (set forth in column 2) that characterize 1. a "Conventional Linear Scan System" that uses PWM and scans a projected image one row at time (see columns 3 and 4); 2. the Projection System 100 (see columns 5 and 6); and 3. a "Conventional Non-scan System that does not perform a scan but rather, includes one mirror per pixel of the projected image (see columns 7 and 8):

TABLE 3

| Symbol | Parameter | Conventional Linear Scan System | | Projection System 100 | | Conventional Non-scan System | |
| --- | --- | --- | --- | --- | --- | --- | --- |
| | | Eqn | Qty | Eqn | Qty | Eqn | Qty |
| FT | Frame Time | 1/60 | 16.7 msec | 1/60 | 16.7 msec | 1/60 | 16.7 msec |
| CF | Color Fields | | 3 | | 3 | | 3 |
| R | Refreshes per Field | | 4 | | 4 | | 1 |
| V | Vertical Lines | | 768 | | 768 | | 768 |
| H | Horizontal Resolution | | 1280 | | 1280 | | 1280 |
| G | Gray Scale Bits | | 8 | | 8 | | 8 |
| P | PWM time slots | $2^G$ | 256 | — | 1 | $2^G$ | 256 |
| RT | Refresh Time | FT/(CF*R*P) | 5.43 usec | FT/(CF*R) | 1.39 msec | FT/(CF*R*P) | 21.7 usec |
| LT | Line Update Time | RT/V | 7.06 nsec | RT/V | 1.81 usec | RT/V | 28.3 nsec |
| MT | Mirror Setting Time | LT | 7.06 nsec | LT | 1.81 usec | LT*V | 21.7 usec |
| | Redundancy | NO | | YES | (fuse) | NO | |

TABLE 3-continued

|  |  | Conventional Linear Scan System | | Projection System 100 | | Conventional Non-scan System | |
| --- | --- | --- | --- | --- | --- | --- | --- |
| Symbol | Parameter | Eqn | Qty | Eqn | Qty | Eqn | Qty |
|  | Failure Sensitivity | Very High | Column Fail | Very Low | 0.4%/ mirror | High | Visible Bad Pixel |
|  | Number of Mirrors | H | 1280 | $H*2^G$ | 327,700 | $H*V$ | 983,000 |
|  | Storage Bits of Array | H | 1280 | H | 1280 | $V*H$ | 983,000 |

For this example, a 1280 by 768 pixel image is assumed. Thus, the projected image includes 1280 horizontal pixels and 768 vertical pixels. This projected image size means that the mirror array of the Conventional Linear Scan System has one row of 1280 mirrors; the mirror array of the Projection system 100 has 1280 columns by 256 rows of mirrors; and the mirror array of the Conventional Non-Scan System has 1280 columns by 768 rows of mirrors. In the table above, a time (called "MT") allocated for each mirror to settle before the mirror receives another update is 7.06 nanoseconds (nsec) for the Conventional Linear Scan System, 1.81 microseconds ($\mu s$) for the Projection System 100 and 21.7 $\mu s$ for the Conventional Non-Scan system.

The mirror settling time of the Conventional Linear Scan System may be too small for use with conventional mirror arrays that may have settling times around 1 $\mu s$. Although the Conventional Non-Scan System has a larger settling time than the projection system 100, the Conventional Non-Scan System may have a relatively high failure sensitivity (as compared to the projection system 100) and may, unlike the projection system 100, need a storage element under each mirror, thereby placing a lower boundary on the pixel size.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
   a mirror array to form a projected image comprising pixels, the mirror array comprising mirrors; and
   a circuit to, for each pixel, control the mirror array to control the number of the mirrors that reflect light into an optical path that intersects a location of the pixel based on an intensity for the pixel.

2. The apparatus of claim 1, wherein, for each pixel, the circuit controls the mirror array to cause a greater number of the mirrors to reflect light into the optical path for a higher intensity level than a number of the mirrors that reflect light into the optical path for a lower intensity level.

3. The apparatus of claim 1, wherein each pixel of the projected image is uniquely associated with at least two mirrors of the array.

4. The apparatus of claim 1, wherein each pixel of the projected image is associated with a number of mirrors of the array substantially equal to the number of potential gray levels of the pixel.

5. The apparatus of claim 1, wherein the circuit does not use pulse width modulation to regulate the intensity of each pixel.

6. The apparatus of claim 1, wherein a first dimension of the array is associated with intensity values for the pixels and a different second dimension of the array is associated with pixel positions of the projected.

7. The apparatus of claim 1, further comprising:
   optics to, for each pixel, merge other optical paths extending from said at least two mirrors into said optical path that intersects the location of the pixel.

8. The apparatus of claim 7, wherein the optics compresses a two-dimensional image formed from light reflected from the mirror array into a one-dimensional sub-image of the projected image.

9. The apparatus of claim 1, wherein, for each pixel, the intensity of the pixel is indicated by a multiple bit digital value and the mirrors of the array are organized into different groups, each group of mirrors being associated with a different bit of the digital value.

10. A method comprising:
    using a mirror array to form a projected image, the mirror array comprising mirrors and the projected image comprising pixels; and
    for each pixel, controlling the mirror array to control the number of the mirrors that reflect light into an optical path that intersects a location of the pixel based on an intensity for the pixel.

11. The method of claim 10, wherein the controlling the mirror array comprises:
    for each pixel, controlling the mirror array to cause a greater number of the mirrors to reflect light into the optical path for a higher intensity level than a number of the mirrors that reflect light into the optical path for a lower intensity level.

12. The method of claim 10, further comprising:
    uniquely associating each pixel of the projected image with at least two of the mirrors.

13. The method of claim 10, further comprising:
    associating each pixel of the projected image with a number of mirrors of the array substantially equal to the number of potential gray levels of the pixel.

14. The method of claim 10, wherein the controlling does not include using pulse width modulation to regulate the intensity of each pixel.

15. The method of claim 10, wherein a first dimension of the array is associated with intensity values for the pixels, the method further comprising:
    using a different second dimension of the array to identify pixel positions of the projected image.

16. The method of claim 10, further comprising:
    merging other optical paths extending from at least two of the mirrors into a single optical path that intersects a location of the pixel.

17. The method of claim 16, further comprising:
compressing a two-dimensional image formed from light reflected from the mirror array into a one-dimensional sub-image of the projected image.

18. The method of claim 10, wherein, for each pixel, the intensity of the pixel is indicated by a multiple bit digital value, the method further comprising:
organizing the mirrors of the array into different groups, each group of mirrors being associated with a different bit of the digital value.

19. A projection system comprising:
condensing optics;
a mirror array to form a projected image comprising pixels, the mirror array comprising mirrors; and
a circuit to, for each pixel, control the mirror array control the number of the mirrors that reflect light into an optical path that intersects a location of the pixel based on an intensity for the pixel.

20. The projection system of claim 19, wherein, for each pixel, the circuit controls the mirror array to cause a greater number of the mirrors to reflect light into the optical path for a higher intensity level than a number of the mirrors that reflect light into the optical path for a lower intensity level.

21. The projection system of claim 19, wherein each pixel of the projected image is uniquely associated with at least two mirrors of the array.

22. The projection system of claim 19, wherein each pixel of the projected image is associated with a number of mirrors of the array substantially equal to the number of potential gray levels of the pixel.

23. The projection system of claim 19, wherein the circuit does not use pulse width modulation to regulate the intensity of each pixel.

24. The projection system of claim 19, wherein a first dimension of the array is associated with intensity values for the pixels; and
a different second dimension of the array is associated with pixel positions of a projected image.

25. The projection system of claim 19, wherein, for each pixel, the intensity of the pixel is indicated by a multiple bit digital value and mirrors of the array are organized into different groups, each group of mirrors being associated with a different bit of the digital value.

26. A projection system comprising:
condensing optics to form a projected image comprising pixels;
a mirror array comprising mirrors;
a processor coupled to the mirror array; and
a flash memory storing instructions to cause the processor to, for each pixel, control the number of the mirrors that reflect light into an optical path that intersects a location of the pixel based on an intensity for the pixel.

27. The projection system of claim 26, wherein a first dimension of the array is associated with intensity values for the pixels; and
a different second dimension of the array is associated with pixel positions of a projected image.

28. An article comprising a computer-readable storage medium storing instructions to when executed cause a computer to:
control a mirror array to produce a projected image, the projected image comprising pixels and the mirror array comprising mirrors; and
for each pixel of the image, control the mirror array to control the number of the mirrors that reflect light into an optical path that intersects a location of the pixel based on an intensity for the pixel.

29. The article of claim 28, further comprising instructions to cause the computer to control the mirror array to direct the reflected light toward the condensing optics.

30. The article of claim 28, further comprising instructions to cause the computer to group mirrors of the array into groups of multiple mirrors, each group being associated with a different pixel of the projected image and the mirrors of each group collectively forming a gray scale intensity for the associated pixel.

* * * * *